United States Patent

Roberts et al.

(10) Patent No.: US 6,999,930 B1
(45) Date of Patent: Feb. 14, 2006

(54) VOICE DIALOG SERVER METHOD AND SYSTEM

(75) Inventors: Steve Roberts, Foster City, CA (US); David Holsinger, Pescadero, CA (US)

(73) Assignee: Extended Systems, Inc., Boise, ID (US)

(*) Notice: Subject to any disclaimer, the term of this patent is extended or adjusted under 35 U.S.C. 154(b) by 13 days.

(21) Appl. No.: 10/113,710

(22) Filed: Mar. 27, 2002

(51) Int. Cl.
*G10L 21/00* (2006.01)

(52) U.S. Cl. .................. 704/270.1; 704/257; 704/231; 704/9; 704/1; 379/88.01

(58) Field of Classification Search .......... 704/270.1, 704/257, 1, 231, 235, 9; 379/88.01, 88.1
See application file for complete search history.

(56) References Cited

U.S. PATENT DOCUMENTS

| | | | |
|---|---|---|---|
| 6,418,440 B1 * | 7/2002 | Kuo et al. ............... 707/10 |
| 6,446,035 B1 * | 9/2002 | Grefenstette et al. ....... 704/1 |
| 6,466,654 B1 * | 10/2002 | Cooper et al. ........... 379/88.01 |
| 6,510,417 B1 * | 1/2003 | Quilici et al. ............ 704/275 |
| 2002/0059069 A1 * | 5/2002 | Hsu et al. ............... 704/257 |
| 2002/0103881 A1 * | 8/2002 | Granade et al. .......... 709/218 |
| 2002/0169604 A1 * | 11/2002 | Damiba et al. .......... 704/231 |
| 2003/0023435 A1 * | 1/2003 | Josephson .............. 704/235 |
| 2003/0023444 A1 * | 1/2003 | St. John ................ 704/270.1 |
| 2003/0036900 A1 * | 2/2003 | Weise ..................... 704/9 |
| 2003/0078766 A1 * | 4/2003 | Appelt et al. ............. 704/9 |
| 2003/0078779 A1 * | 4/2003 | Desai et al. ............. 704/257 |
| 2003/0101054 A1 * | 5/2003 | Davis et al. ............. 704/235 |

* cited by examiner

*Primary Examiner*—Richemond Dorvil
*Assistant Examiner*—Qi Han
(74) *Attorney, Agent, or Firm*—Ormiston & McKinney, PLLC

(57) ABSTRACT

A voice user interface for accessing data is provided. This method and system receives a set of variables from a voice recognizer processing a voice request for information in a backend system; processes an integration method using the set of variables returned from the recognizer and an unstructured grammar based on entries in the database fields of a backend system; requests backend data from the backend system using the integration method and the set of variables as applied to the unstructured grammar; and receives backend data from the backend system responsive to the integration method used to request the backend data. Processes are described that add data associated with a database to increase the accuracy of interacting with the database through a voice interface and create the unstructured grammar for improved voice recognition capabilities.

22 Claims, 6 Drawing Sheets

VOICE DIALOG SERVER METHOD AND SYSTEM

CROSS REFERENCE TO RELATED APPLICATIONS

This application is related to application Ser. No. 09/950,416 assigned to the assignee of the present invention, ViaFone Inc. filed Sep. 11, 2001 entitled "Method and System for Integrating Applications and Mobile Networks" and is incorporated by reference in the entirety.

BACKGROUND OF THE INVENTION

The present invention relates to integrating voice recognition as an interface to applications.

The voice user interface (VUI) is rapidly becoming a versatile and powerful access method to many new applications. VUIs combine speech recognition and text-to-speech synthesis as a conduit to access the functional capabilities underlying the particular application. Using spoken commands and keywords, a user can interact with the application and a computer without relying on full-sized computing devices or venturing to a home office. This is particularly useful for sales employees and field personnel working directly with potential customers and clients on-site and away from their offices.

VUIs offer many advantages not available with conventional graphical user interface (GUI) packages. With the VUI, access to computer systems and applications are limited only by the availability of a voice connection. If a wireless connection is used, the user can maintain connectivity even while moving or in a mobile environment as long as mobile coverage is provided by the mobile service provider.

Costs associated with the VUI are also reduced as the VUI hardware requirements can be less expensive than other comparable mobile communication solutions. For example, a wireless telephone or a wired telephone can be used with the VUI to access data systems with little or no hardware or software modifications. The VUI does not require more expensive specialized devices like personal device assistants (PDA) and wireless application protocol (WAP) compatible phones to operate effectively.

Unfortunately, there are many obstacles to deploying the VUI rapidly on a large number of applications. The first concern is that the VUI is difficult and expensive to make compatible with existing legacy applications and enterprise solutions. Second, conventional VUI developers must also carefully design grammars and recognition tools tailored to the particular users involved. Meeting these goals is time-consuming, expensive and difficult to implement given the different objectives applications and users generally have.

As voice technology and VUIs continue to develop, better methods and systems for integrating the VUI and other voice technology need development and deployment.

SUMMARY OF THE INVENTION

One aspect of the present invention includes a method and system for accessing data through a voice user interface. This method and system receives a set of variables from a voice recognizer processing a voice request for information in a backend system, processes an integration method using the set of variables returned from the recognizer and an unstructured grammar based on entries in the database fields of a backend system, requests backend data from the backend system using the integration method and the set of variables as applied to the unstructured grammar and receives backend data from the backend system responsive to the integration method used to request the backend data.

Yet another aspect of the present invention includes a method and system for accessing data through a voice user interface. This method and system receives a set of variables from a voice recognizer processing a voice request for information in a backend system, processes an integration method using the set of variables returned from the recognizer and an unstructured grammar based on entries in the database fields of a backend system, requests backend data from the backend system using the integration method and the set of variables as applied to the unstructured grammar, receives backend data from the backend system responsive to the integration method used to request the backend data, and ranks the received data using extra-grammatical information to increase the probability that the backend data provided is responsive to the voice request.

An additional aspect of the present invention includes a method and system that processes the data associated with a database to increase the accuracy of interacting with the database through a voice interface. This method and system identifies an original data entry in a database field of the database, wherein the original data entry is capable of being referenced with one or more additional identifiers, associates the one or more additional identifiers that correspond to the original data entry in the database field with the database and provides the one or more additional identifiers in addition to the original data entry when comparing data associated with interactions made through the voice interface against data in the database.

Another aspect of the present invention includes a method and system for constructing a grammar responsive to voice requests for data from a database. This method and system creates an unstructured grammar by combining data entries from data fields in the database of the backend system, generates permutations of the data entries to increase the overall size of the grammar and probability of identifying matches against the grammar from the voice requests, prioritizes the permutations of the data entries according to information in the database and presents one or more of the prioritized permutations according to selections made by a user.

The details of one or more embodiments of the invention are set forth in the accompanying drawings and the description below. Other features and advantages of the invention will become apparent from the description, the drawings, and the claims.

DETAILED DESCRIPTION

Figure 1:
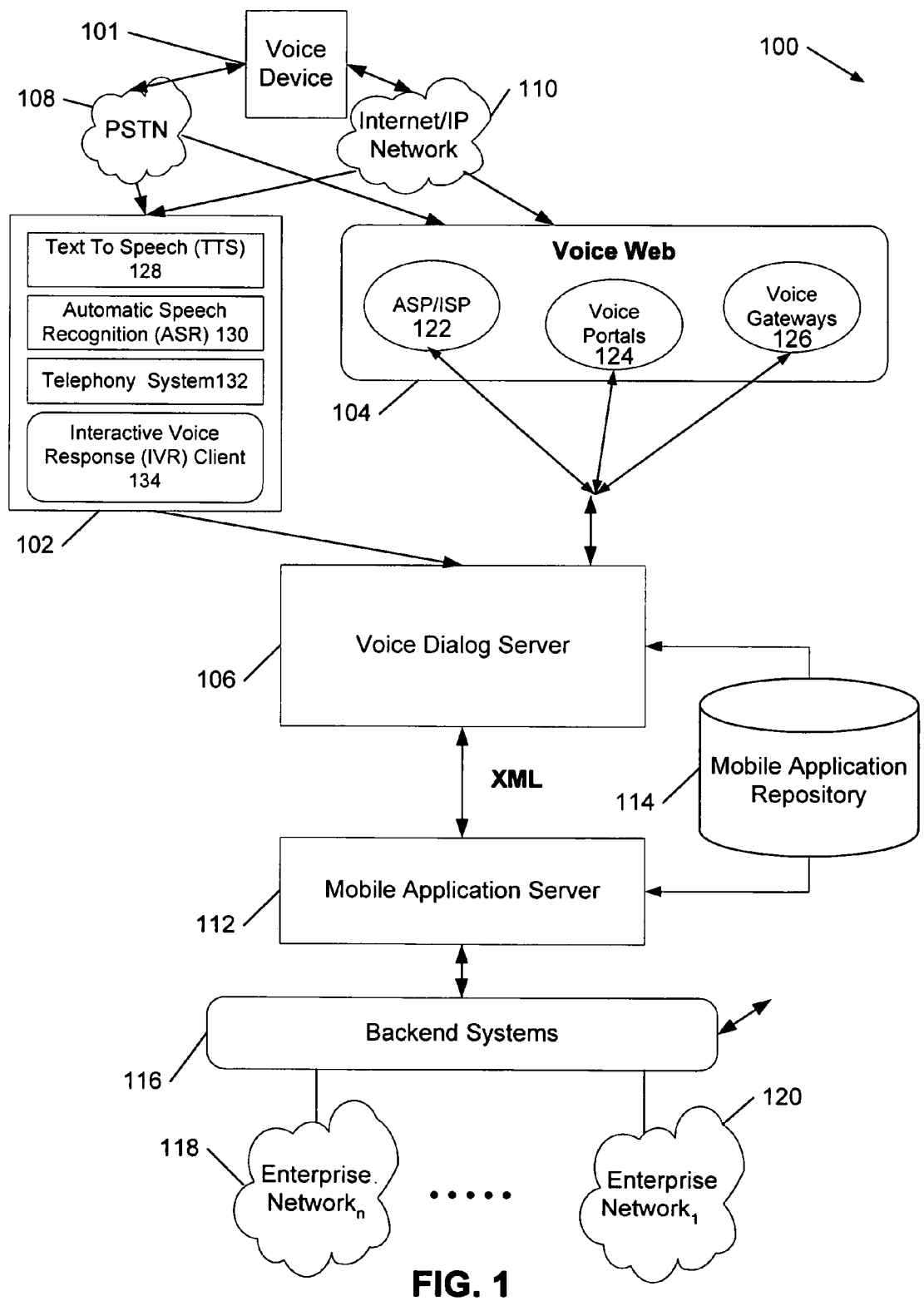
FIG. 1 is a block diagram of a system that uses a voice user interface (VUI) to access backend systems used in an enterprise.

FIG. 1 is a block diagram of a system 100 that uses a voice user interface (VUI) to access backend systems in an enterprise. System 100 is designed to allow voice requests to be made across a number of different enterprise networks and retrieve information from backend systems. These backend systems store and organize various types of information used to run finance, sales, human resources, engineering and other departments inside an enterprise organization.

One implementation includes a telephony component 102, a voice web component 104, a voice dialog server 106, and uses a public switched telephone network (PSTN) 108 and the Internet 110. In one implementation, users utilize PSTN 108 or Internet 110 to access telephony component 102 and voice web component 104 and communicate with voice dialog server 106.

Both voice dialog server 106 and a mobile application server 112 are operatively connected to a mobile application repository 114. Voice dialog server 106 performs a number of operations related to voice recognition and increasing recognition accuracy in accordance with the present invention. Mobile application server 112 performs transformations on data allowing mobile phones to communicate efficiently and effectively with backend systems 116 and enterprise networks 118. The mobile application repository 114 acts as a database and storage area to hold information used to assist in performing various aspects of these voice recognition and mobile communication functions.

Corporations and businesses use implementation of the present invention to integrate a VUI with backend systems 116 and enterprise networks 118 through 120. Many portions of the VUI are associated with voice dialog server 106 but may also be distributed over mobile application repository 114, mobile application server 112, and, to some extent, telephony component 102 and voice web component 104. Generally, these backend systems 116 include enterprise and general applications developed for Customer-Relation Management (CRM), Enterprise Resource Planning (ERP), Personal Information Management (PIM), Sales Force Automation (SFA), Field Service Administration (FSA), Supply Chain Management (SCM) and other applications. Additional third-party applications may also include Siebel Systems, i2, WebMethods, SAP, Microsoft and PeopleSoft applications for human resources, distribution, manufacturing and supply chain management. Generally, backend systems 102 are servers originally developed for use with desktop systems that now need to be accessed through a VUI available through various devices and methods.

Aspects of the invention contained in voice dialog server 106 and other portions of system 100 provide numerous benefits to companies integrating a VUI into their enterprise network and backend systems; few of these benefits are described herein. First, implementations of the present invention facilitate rapid integration of enterprise applications with a VUI. Users can access functionality built into existing enterprise systems using the VUI without requiring significant amounts of custom code and drivers. With the VUI in place, users can also access their enterprise systems while away from the office or in the field over a mobile phone or other voice compatible device. The VUI can further retrieve data from enterprise systems as well as store and update information in these systems. Second, implementations of the invention facilitate rapid integration of the VUI with mobile-relevant options including location-based functionalities, and in some cases, system initiated phone calls. Further, by connecting multiple back-end systems together through a common VUI, a single-image enterprise-wide solution can be developed tying together functionalities from multiple enterprise networks and backend systems including common data storage and cross platform homogenous or heterogeneous communication.

Advantageously, a VUI designed in accordance with the present invention is not limited to directed dialogs that are difficult to use and commonly found in conventional voice user interface systems. To obtain information using conventional directed dialogs, the user must follow a predetermined set of voice prompts or not receive the requested information. Using implementations of the present invention, however, voice dialogs are more open-ended and allow users to make voice requests in a more free-format/natural manner rather than adhering to difficult and complex grammars that are hard to use.

Because aspects of the present invention provide for a flexible dialog and unstructured grammar model, several different methods of accessing information on the backend systems and enterprise are possible. For example, the user can access the system by specifying directly all the keywords in proper order as they appear in the database. If this occurs, system 100 will provide the user with information from backend systems 116 and databases rapidly. Alternatively, however, a user can also specify a different sequence of keywords or alternate terms to access information in backend systems 116. In the latter case, system 100 would provide hints or additional voice prompts along with multiple records from one or more databases associated with backend systems 116 and then allow the user to choose the best results. This additional flexibility also improves recognition as the grammar is larger and the likelihood of matching is much higher.

In operation, a user can interface with system 100 through a VUI associated with voice device 101 and telephony component 102. Access is also available through the Internet/IP network 110 using voice web component 104 compatible with Voice XML or other programming languages. Telephony component 102 includes a traditional telephony system 132, automatic speech recognition (ASR) 130, a text-to-speech component (TTS) 128 and an interactive voice response client (IVR) 134. Telephony system 132 not only includes traditional plain old telephone system (POTS) but private branch exchange (PBX) systems typically used by businesses and large enterprises.

Generally, voice requests placed over telephony system 132 are processed by automatic speech recognition ASR 130 converting analog speech into to digitized information based, in part, on fast Fourier transforms and Hidden Markov Model (HMM) processing techniques. These processes divide analog speech into discrete time slices and using signal processing converts them into the frequency domain. Acoustic matching is performed on these frequency components to identify phonemes and sub phonemes with a library of potential sounds. Words are also determined according to an adaptive language model that analyzes groups of words based on statistical word usage for a user or a population of users. Other adaptive language models and the acoustic matching process help ASR 130 create a set of variables and semantic instructions for further processing. To play back speech, words are converted using TTS 128 within telephony component 102. TTS 128 simulates speech in a human-like form for listening on a telephone or other voice compatible devices.

IVR 134 allows a user to enter and interact with data through a conventional telephone using a VUI similar to a computer terminal used to enter and interact with data. Early IVR systems utilized DTMF (dual tone multifrequency) interactions to facilitate applications involving banking, home shopping, credit authorization, sales order entry, shipment and tracking and cable TV pay-per-view. More sophisticated applications, however, using aspects of the present invention can be retrofitted with a VUI and/or combined with DTMF as needed to access an enterprise network and a backend system.

Voice requests also pass through voice web component 104. Voice web components 104 receive voice input over a VUI associated with application service provider/Internet service providers (ASP/ISP) 122, voice portals 124 and voice gateways 126. ASP/ISP 122 represents companies providing both Internet access and access to particular applications over the Internet. In this context, the VUI allows users to access these Internet accessible applications offered by ASP/ISP 122 using voice device 101 and VUI described herein.

Voice portals 124 interface to Internet 110 and other similar networks using VUI rather than the traditional web browser used for data browsing HTML. Instead of HTML or conventional programming languages, voice portals 124 are developed using a voice compatible programming language such as VoiceXML that defines voice dialog models and voice interactions. VoiceXML itself is a high-level language for authoring voice applications. Developers are able to write voice applications using simple markup tags and scripts rather than the more traditional and complex programming languages. The VoiceXML scripts coordinate speech dialog systems accessed over telephony system 132 and using TTS 128, ASR 130, and IVR 134. Although the Internet and web development technologies are used to develop and deploy applications, the voice devices making the telephone calls access the Internet indirectly and generally do not need specialized hardware/software.

VoiceXML scripts specifies audio prompts to be played to callers and an unstructured grammar along with other implementation features designed in accordance with the present invention that the recognizer uses to identify words responsive to the prompts. Generally, VoiceXML applications and scripts are hosted on voice dialog server 106 and accessed using a VUI. Voice dialog server 106 is a system running one or more applications including a VoiceXML generator and interface to telephone system 132. Scripts may be generated dynamically or statically by voice dialog server 106. In one implementation, VoiceXML scripts instruct the VUI to play prompts and to start ASR 130 using an unstructured grammar of the present invention. Upon recognizing a voice request, the VUI selects and transitions to other dialogs within the same VoiceXML script or may be retrieved from voice dialog server 106. Alternatively, VUI can also retrieve VoiceXML scripts stored on any server accessible over the Internet or an enterprise intranet (not shown).

Voice gateways 126 are used to perform voice communication over the Internet using voice over Internet-protocol (VOiP). These systems may bypass traditional local and long distance communication telephony communication and instead use packet services provided by the Internet to transmit voice over IP protocol based networks.

Implementations of the present invention facilitate voice communication traveling over telephony component 102 and voice web component 104 received by voice dialog server 106. Voice dialog server 106 processes these voice requests in accordance with the present invention to access backend systems 116 and improve accuracy in data retrieval and data storage in these corresponding systems. As previously described, voice dialog server 106 allows for freeform voice requests to be made without defining complicated and difficult to use grammars. Using statistical techniques and efficient processing consistent with the present invention, voice dialog server 106 greatly improves the development and use of the VUI to these backend systems 116 on enterprise networks 118 through 120. These backend systems 116 are represented in voice dialog server 106 using sets of rules and a data-driven framework.

To integrate backend systems 116 with the VUI, the rules are developed to work with specific applications on backend systems 116 and stored in a mobile application repository 114. Calls made through the VUI are intercepted by voice dialog server 106 which proceeds to obtain the proper rules from mobile application repository 114. Once voice dialog server 106 identifies the proper rules, the required resources are invoked to play the correct prompts and to manage recognition engines associated with telephony component 102 or voice web component 104. For example the voice dialog server 106 applies a set of rules contained within a dialog to determine the options to be presented to user as a user proceeds through a dialog. The users voice requests determine the subsequent steps voice dialog server 106 takes in response to their voice requests. Typically, voice dialog server 106 expresses prompts and interactions in the VUI using a standard communication language for voice such as Voice XML to maintain compatibility with other voice XML compatible scripts and voice browsers. Of course, the present invention can be developed using many different programming languages and is not limited to VoiceXML implementations exclusively. For example, implementations of the present invention can also be developed compatible with the Speech Application Language Tags (SALT) standards for voice application development.

Mobile application server 112 receives requests and delivers responses with voice dialog server 106 in extensible markup language (XML). This mobile application server 112 keeps track of the characteristics associated with many mobile devices as needed for processing voice and non-voice information. For example, DTMF input received by mobile application server 112 is cross-referenced to a large hierarchical database associating the signal tones with specific inputs intended by a user. Details on mobile application server 112 are described in co-pending United States patent application assigned to the assignee the present invention, entitled, "Method and Apparatus for Integrating Mobile and Data Networks" filed Sep. 11, 2001, application Ser. No. 09/950,416 and Incorporated by reference in the entirety herein for all purposes.

Backend systems 116 represent a variety of both custom and third-party software applications developed for enterprise-wide solutions and mission-critical corporate applications. For example, as described above these applications include CRM, ERP, PIM, SFA, FSA, SCM and other applications. The enterprise networks 118 through 120 represents all other corporate computing and systems within an enterprise that may have direct or indirect connection with backend systems 116. These include local area networks (LAN), wide area networks (WAN), secure and unsecure remote access terminals used for telecommuting and field service communication and various types of peripheral equipment and systems.

Figure 2:
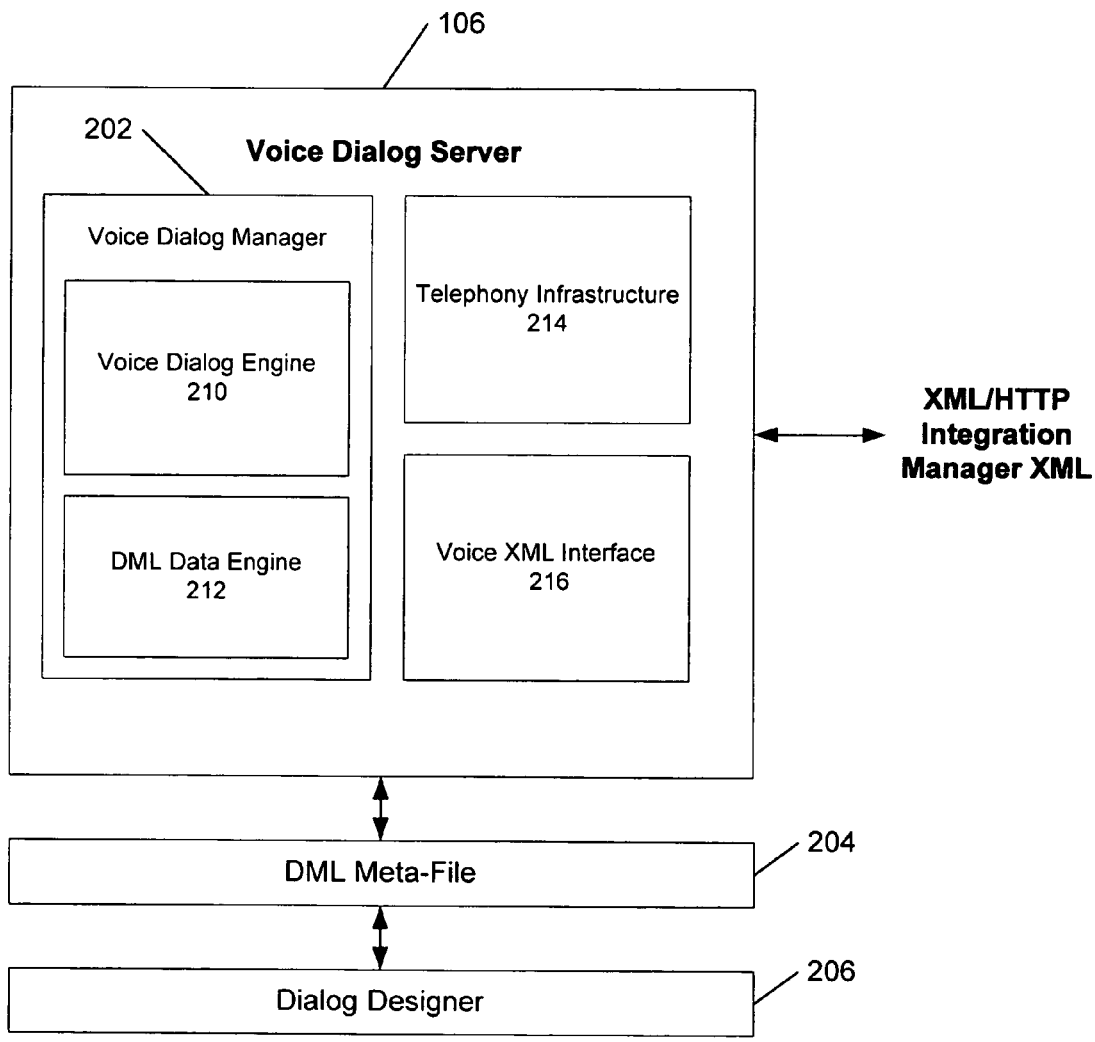
FIG. 2 is a block diagram representation of a voice dialog server and additional related tools and data.

FIG. 2 is a block diagram representation of voice dialog server 106 and additional related tools and data. In one implementation, voice dialog server 106 includes a voice dialog manager 202, a dialog modeling language (DML) file 204, and a dialog designer 206. Voice dialog manager 202 includes a voice dialog engine 210, a DML data engine 212, a telephony infrastructure component 214, and a voice XML interface 216. Functions facilitated by voice dialog engine 210 include DML processing, grammar management, context-aware personalization, and application navigation.

DML is a language useful in processing spoken responses through application of a series of states and constraints. Spoken responses are interpreted according to a logical series of states based upon the context and logic within an application. Using additional constraints, phrases within the spoken responses are further combined or concentrated when possible. This processing permits the merger of data objects or information when it is meaningful and helpful to enabling natural language interaction and free-form responses.

DML processing includes receiving information from DML file 204 and specifying a VUI front end for voice interaction. Voice dialog engine 210 interprets DML file 204 to determine how to present audio information to a user and link to other various application states. Processing DML file 204 also determines application response to user input. For example, a user specifying the voice request "main menu" can cause voice dialog engine 210 processing DML file 204 to list off to user the various options in the main menu for interacting with a particular backend systems 116. Also, a user can also provide a number of keywords processed against an unstructured grammar of the present invention to retrieve information from backend systems 116 and related databases.

Further, voice dialog engine 210 is also charged with managing grammars and, in some cases, dynamic generation of unstructured grammars for a particular backend systems 116. To generate a grammar, voice dialog engine 210 processes databases and fields on backend systems 116. The data entries in the fields of these databases are used to create an unstructured grammar consistent with the present invention and described in further detail later herein. In one implementation, this grammar further includes presenting a user with several different selections when interacting with the voice user interface (VUI). Updates are made to this unstructured grammar as additional information is added or updated in the databases associated with backend systems 116. Because the grammar changes automatically and incrementally, updated grammars can be provided to ASR 130 less frequently without significantly compromising the voice recognition accuracy. For example, updated grammars used by ASR 130 can be provided once a day rather than on-demand as additional keywords are added to the grammar or keywords in the grammar are modified.

Context-aware personalization is also performed by voice dialog engine 210. This personalization can include tailoring grammars and making changes in dialog flow by adding or removing relationship among states. For example, processing DML file 204 can be based on a user and a particular history accessing the VUI for one or more backend systems 116. In this manner, personalization is used to increase the accuracy of the VUI and speedup locating and processing data on backend systems 116 through the VUI.

For example, a sales person generally enters new leads and sales information into a sales force automation backend system. Record of the sales person entering data into this backend system is entered into a historical record associated with the sales person. Subsequent voice interactions through VUI by this user requiring a search then queries various backend systems using the historical record to prioritize and/or increase the weight for searches on the sales force automation backend system. Further, regional/graphic information associated with a sales person or other user can also be used to personalize search results and data processing. A sales person's territory or customer accounts can be used to further increase the accuracy of interactions through the VUI. Voice interactions from the sales person search backend systems 116 and further constrain the results according to the sales person's regions or territories. This generally increases the accuracy of ASR 130 and the VUI as it is most likely for a person to be interested in customers within their territory or geographic region of responsibility.

In the event the VUI does not require additional data from backend systems 116, voice dialog engine 210 can use DML file 204 and other information to guide a user through higher levels of an application. In these areas of the application the user may navigate lists of options or functions provided by backend systems 116 without further access to the backend systems. For example, DML file 204 can provide user with a set of options for interacting with backend systems 116 or can list the backend systems 116 available for access through VUI.

DML file 204 includes grammars, semantic dictionaries, and other descriptions. In one implementation, grammars are generated based on data contained in backend systems 116. These grammars are unstructured grammars in accordance with the present invention and include permutations of data in the various data fields of backend system 116 databases thereby increasing the accuracy and efficiency of voice requests being made. Larger permutations can be contained partly in DML file 204 and also in a database on another network-attached server. Semantic dictionaries associated with DML file 204 can include a set of words and commands typically used by a class of users or specific users of the VUI and system. Alternatively, this information can also be stored and retrieved from storage on a network-attached server.

DML file 204 also includes high level diagramming information for organizing complex voice based interactions through VUI. This includes, for example, logging into a secure application, retrieving confidential information from backend systems 116 with biometric (i.e. voiceprints) authentication/authorization, performing complex electronic commerce transactions using the VUI and updating sales records and inputting sales reports in database associated with backend systems 116 using the VUI.

Figure 3:
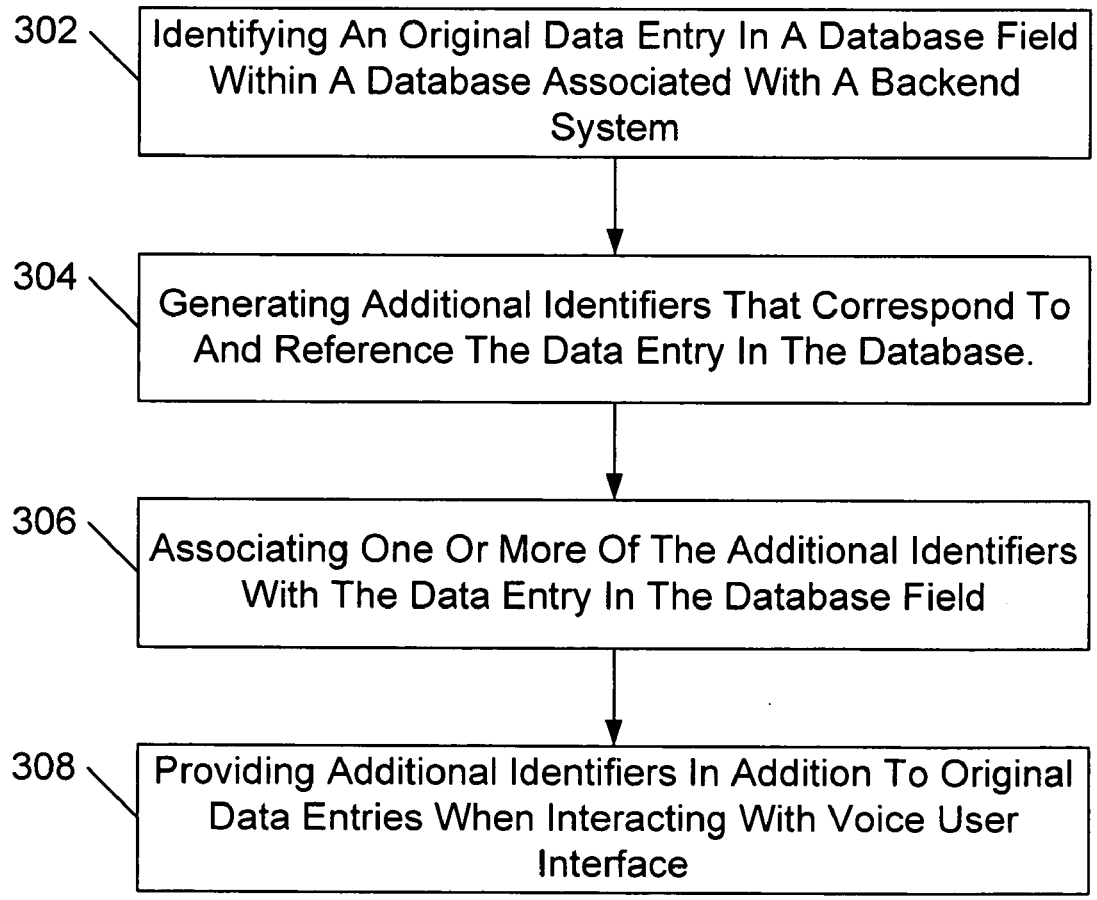
FIG. 3 is a flowchart diagram of the operations used for increasing the set of identifiers associated with backend systems.

FIG. 3 is a flowchart diagram of the operations used for increasing the set of identifiers associated with backend systems 116. Unlike convention systems, the present invention does not remove data through "data cleaning" in an attempt to constrain the data entries in the databases simplify searches. Rather, the present invention adds identifiers related to the original entries in the database that a user is likely to request. This approach methodically increases the number of identifiers associated with a database in backend systems 116 to increase the probability that a users voice request will be fulfilled. Users are not required to adhere to specific grammars or identifiers contained as original entries in the database as many identifiers can be used to identify the original data entries in the database.

On a set frequency or as part of a database maintenance routine, original data entries in a database are identified as candidates for additional identifiers (302). In most cases, only a certain number of the original entries in the database would be associated with additional identifiers. These original entries can be important identifiers that identify a customer or client or identifiers typically referenced by many different names. Once identified, one or more additional identifiers are associated with the original data entries associated with the databases of the backend (304). In one implementation, these identifiers are included in mobile application repository 114 illustrated in FIG. 1.

Additional identifiers include both accurate alternate references to the original data entries as well as errors typically made by users trying to reference the data entries through the VUI. Accordingly, these identifiers are typically selected from a set of identifier types including abbreviations, alternate abbreviations, synonyms, homonyms, misspellings, slang, vernacular and any other identifiers deemed to relate to the original entries in the database. Additional identifiers are associated with one or more of the original entries in the database from backend systems 116 (306). As searches are made to fulfill voice requests from the VUI, both the original entries and the additional entries in the database are compared and considered (308). These additional entries increase the likelihood of rapidly finding a match between a voice request and data in the databases from backend systems 116.

Figure 4:
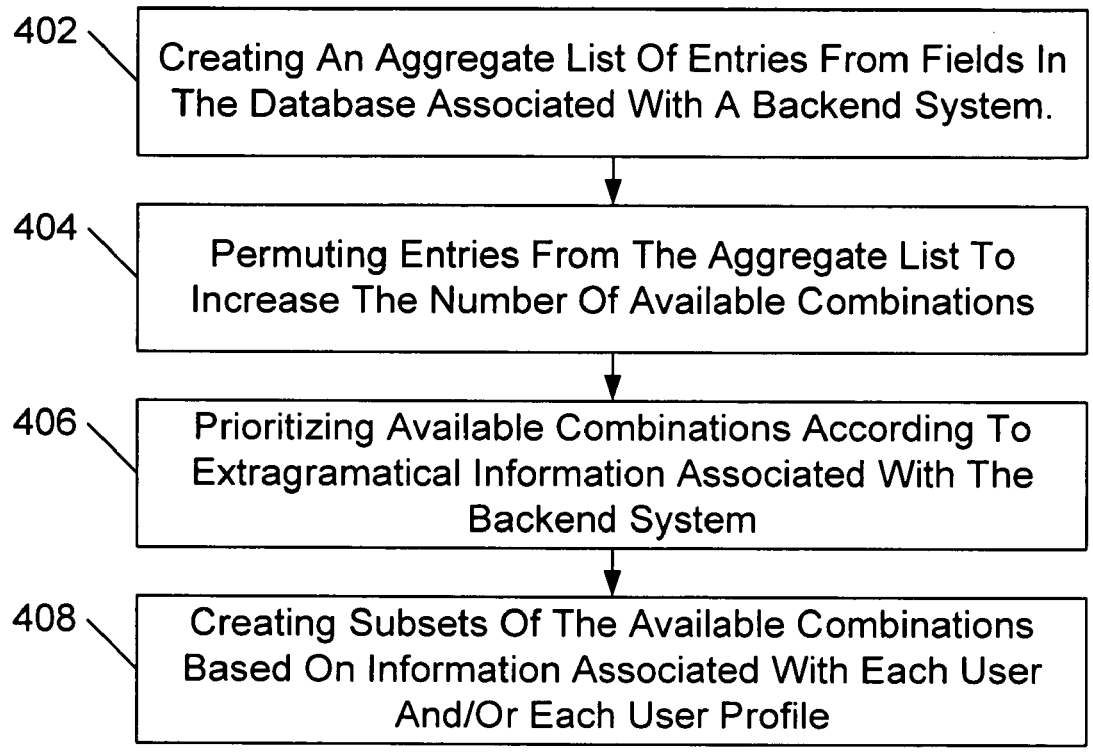
FIG. 4 is flowchart diagram of the operations used to create the unstructured grammar using data entries in backend systems.

FIG. 4 is flowchart diagram of the operations used to create the unstructured grammar using data entries in backend systems 116. At some predetermined time interval or on demand, an aggregate list of entries is created from fields one or more databases associated with a backend system (402). The resulting aggregate list represents a large unstructured grammar containing keywords from the original data entries in the databases. This particular grammar is advantageous as it is unstructured and has few semantic requirements that a user must follow. Removing the complex structure typically found in conventional grammars and leaving it unstructured allows users to speak more freely using the voice interface to access data.

In one implementation, this unstructured grammar is generated dynamically when new information is added to a database associated with a backend system. For example, the grammar generation described in FIG. 4 can be performed on demand or at a fixed time interval daily, weekly, quarterly or prior to a significant business event.

The unstructured grammar described in FIG. 4 is also updated as new information is entered on the databases associated with the backend systems. For example, a new client entered into the database associated with a backend system or a new sales opportunity entered into the system would cause the automatic and dynamic generation of the unstructured grammar. Because the grammar changes slowly over time, updates and grammar generation can take place in the evenings or during non-peak hours rather than on demand. In most cases, the users can retrieve the information they need during peak or working hours without delay while the grammars are regenerated or updated.

This unstructured grammar is further enhanced by permutating entries from the aggregate list (404). This permutation of entries widens the scope of possible matches in the grammar by greatly increasing the number of acceptable and available combinations for later matching. For example, a user operating a VUI to backend systems 116 can request information by specifying different word orders and is not limited to simply one specific sequence of keywords. Unlike conventional grammars, the unstructured grammar is not limited to the original ordering of entries in the databases.

To make this unstructured grammar work more efficiently, extra-grammatical constraints and subsets are created rather than overly complex grammars that a user may find hard to learn. One added constraint combines extra-grammatical information associated with the backend system with the unstructured grammar to prioritize the permutation of combinations (406). These priorities used can take into account the frequency information occurs in backend system, the frequency of information requested from the backend system or the relevance of certain keywords to the subject matter contained and/or described in backend system. For example, CRM system can automatically put a higher priority to a permutation of entries describing a customer, a recent sale and a purchase order number. In the context of a CRM backend system, these entries would have a higher priority than other combinations not containing these fields.

Yet another constraint added to the unstructured grammar includes creating subsets of the available combinations based on information associated with each user or their user profile (408). Implementations of the present invention increase the accuracy of voice recognition by grouping combinations of entries from fields in the database along with information about a user. This extra-grammatical information describing a user works well for refining an unstructured grammar, in part, because users tend to request records they have created, accessed or worked with in the past.

While FIG. 4 processes an unstructured grammar prior to a voice request made through the VUI, an alternative implementation could cause generation of such a unstructured grammar on demand. Instead of updating the grammar asynchronously, this implementation of the invention would check for updates and update the grammar each time a user makes a request. Because the grammar is updated frequently and on demand, this latter approach would provide an incrementally more robust grammar yet may delay a user's perception of the voice interface system's responsiveness.

Figure 5:
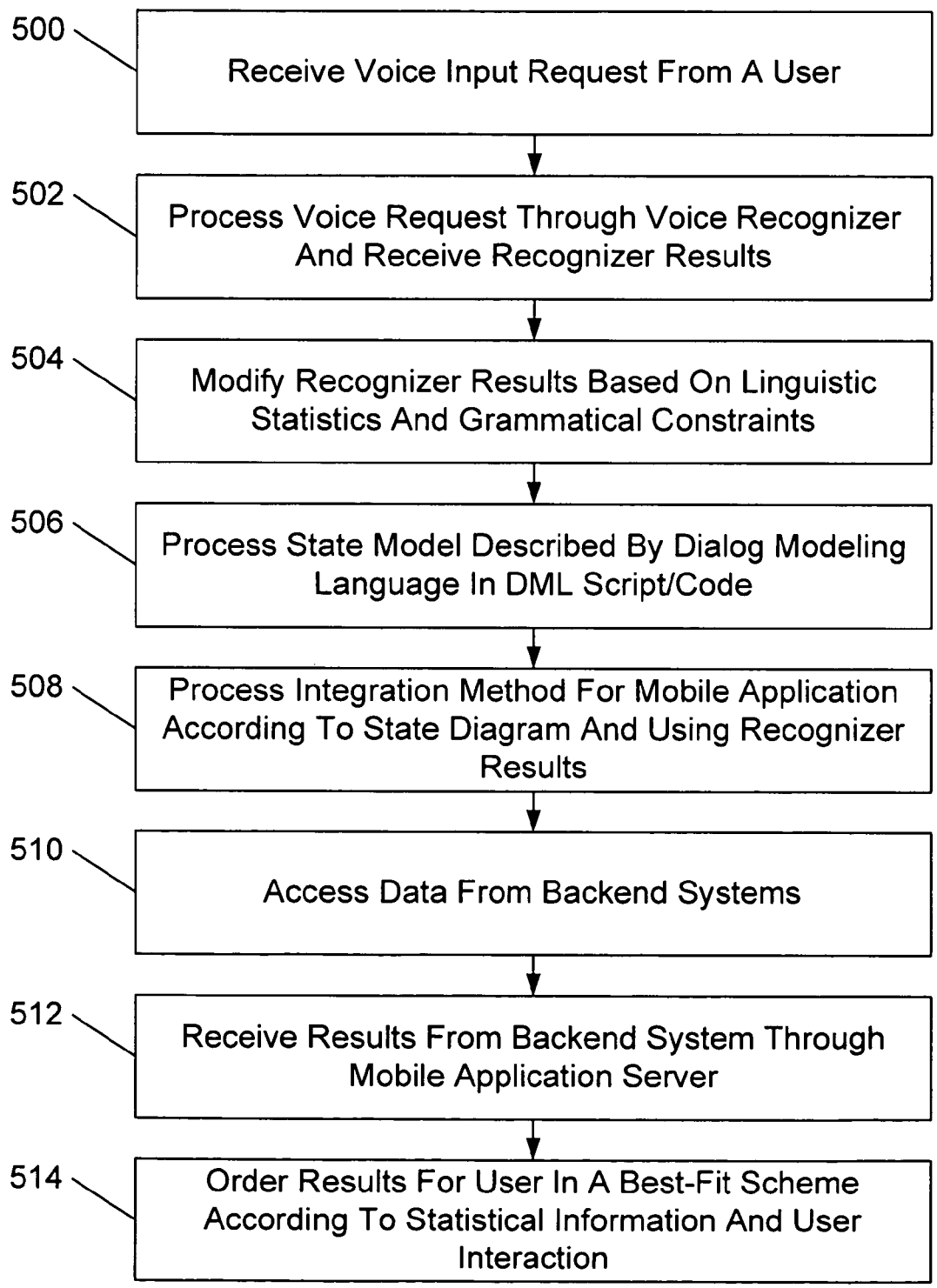
FIG. 5 is a flowchart diagram describing the operations for using a VUI designed in accordance with present invention.

FIG. 5 is a flowchart diagram describing the steps a user takes when using a VUI designed in accordance with present invention. Initially a user provides a voice request for information from a backend system and database (500). The user makes this request by specifying a set of keywords the user believes are stored in one or more records in a particular backend system and database. Because the grammar being used is unstructured, the user is not required to enter or request these keywords in a specific sequence or order. Further, they're also not required to add special tokens or descriptions to access the information. In most cases, this enables a user to requests information in a free-form manner and not adhering to complex grammars.

In one implementation, the voice request from the user is processed through a voice recognizer (502). This voice recognizer divides the voice request into a set of phonemes that are then compared with words in the particular language being spoken by the user. The voice recognizer suggests a match between words with a specific known combination of phonemes that closely match the phonemes detected in the voice request. To increase the number of suggested matching words, a confidence threshold within the voice recognizer is reduced to a minimal level. Reducing the confidence on the voice recognizer causes the voice recognizer to generate many potential matches even when the confidence in the match is low.

The voice recognizer also provides matches based on the unstructured grammar provided and described previously. In most cases, the unstructured grammar allows the voice recognizer to suggest matching words requested in almost any combination or sequence. The voice request otherwise rejected by complex grammars found in conventional systems are identified and accepted by the recognizer used in the present invention in part because the unstructured grammar has little or no constraints on the semantic ordering of the voice request phrases. In one implementation, a voice recognizer developed by Nuance communications Inc. of Menlo Park, Calif., can be used for the voice recognizer and present invention. However, other voice recognizers capable of recognizing speech and generating a corresponding text thought to match the speech can also be generated. This includes systems developed by SpeechWorks International, Inc. of Boston, Mass. and other voice recognition companies such as Lernout & Hauspie/ScanSoft, Inc. of Peabody, Mass.

The present invention receives text variables from the voice recognizer and processes them to more accurately retrieve information from the backend system. In one implementation, the voice recognizer results are modified based on linguistic statistics and other grammatical constraints (504). These modifications attempt to further improve the accuracy of the recognizer and the text generated from voice request. For example, common phoneme errors in the voice recognizer are determined according to a statistical analysis process. Other errors in spelling, database entries, and other entries are also analyzed using statistical analysis and used to improve the quality of information from the voice recognizer.

Variables and other information are then processed according to a state as described using the Dialog Modeling Language (DML) module compatible with DML data engine 212 (506). As described previously, DML is used to describe the proper sequence of voice interactions between the VUI and the backend systems and databases. In one implementation, the type of information specified in DML determines what information to obtain from backend system and databases. For example, DML used for processing a user's logging into a system generally requires a login and password and sometimes authentication code. Because information in DML relates to logging onto the system, the voice recognition can be constrained to search through database entries having login identifiers, passwords and security codes.

To obtain information from backend systems and databases, present invention processes an integration method using voice recognizer results and information in the DML diagram (508). For example, the integration method can be a structured query language (SQL) request for accessing information in an SQL compatible database.

This integration method is delivered to the databases and backend systems on the enterprise side to access data (510). In one implementation, this information references mobile application repository 114 and mobile application server 112 in FIG. 1. These components facilitate the translation of data information provided through a mobile device rather than through the VUI using the human speech. This includes entering data strings through keystrokes on a phone or through menu system selections on the phone. For example, mobile application repository 114 and mobile application server 112 can send the proper control sequences and characters entered onto a mobile phone as keystrokes between voice prompts and interactions made through a VUI.

Results from processing the integration method pass from backend system and databases through mobile application server 112 for further processing (512). Results are processed for the particular user in a best-fit scheme (514). Because a large open unstructured grammar is used a few different results from backend systems and databases are provided to the user. In contrast to conventional systems that provide only one closely matching result, many results are ordered according to a probability and presented to the user. This allows the user to select the best match from the various matches rather than relying entirely on the system to find the best match.

Many other types of historical information for a user can be added to improve the accuracy and efficiency of the voice recognition. The extra grammatical information used to rank the data can be based on historical voice requests made by a user as well as historical category information previously requested by the user. These historical entries include recording interactions with a user and selection of the results from the backend systems and databases. For example, the user may be given five or ten phrases that seemed to best match both in the voice request and data in the databases associated with the backend system. Instead of deciding which of these items are correct, the present invention ranks the results in a best-fit list and then allows the user to confirm the selection of the top candidate offered or to select the correct result from the many. Many potential entries are excluded from the list using extra-grammatical information as described above. The user does not have to listen and decide upon all the results but only those results most likely responsive to the original voice request.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor, touch-screen, or LCD screen for displaying information to the user and a keyboard and a pointing device such as a mouse or a trackball by which the user can provide input to the computer system. The computer system can be programmed to provide a graphical user interface through which computer programs interact with users.

Figure 6:
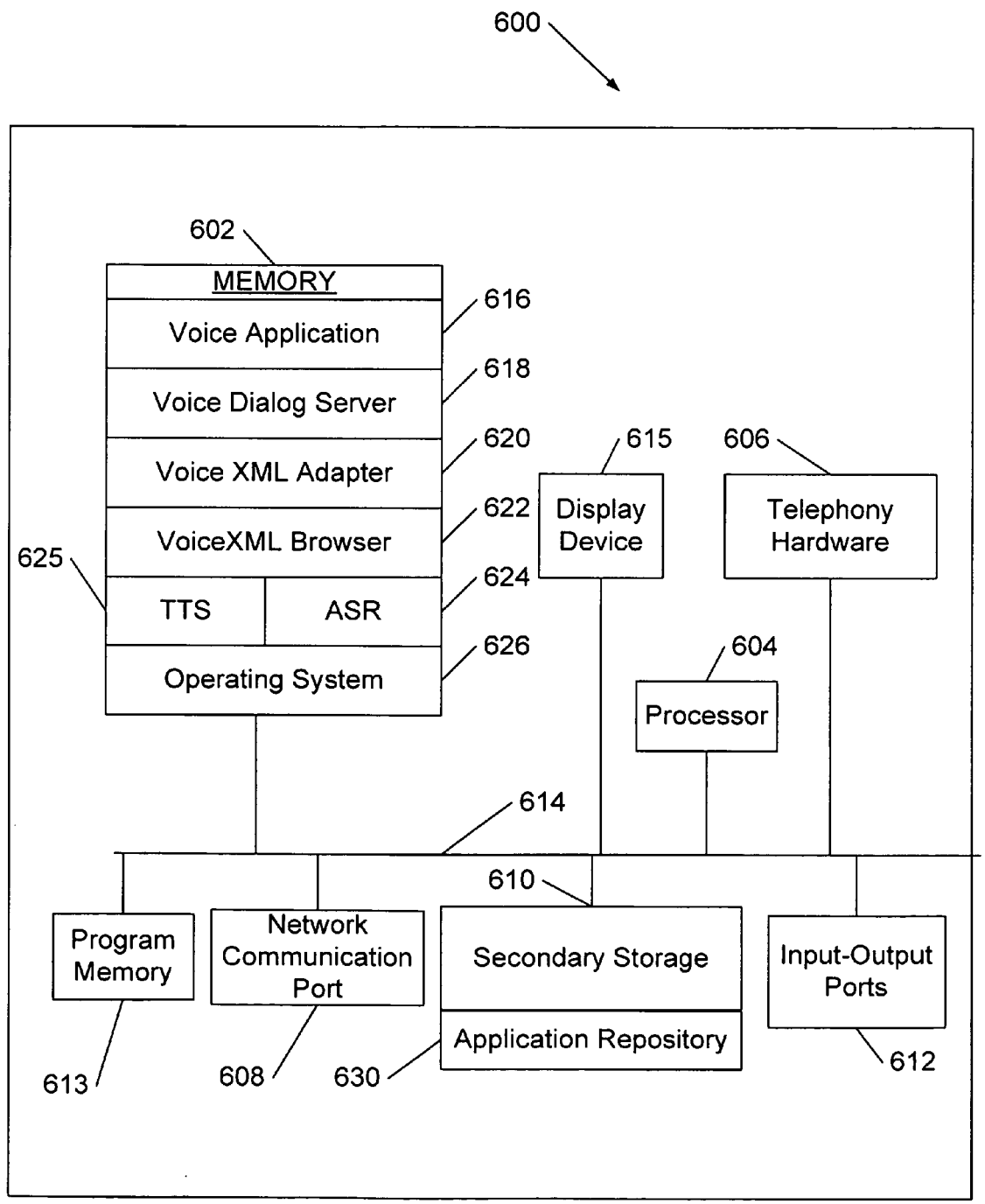
FIG. 6 illustrates a block diagram representation of a programmable processing system suitable for implementing or performing implementations of the invention.

An example of one such type of computer is illustrated in FIG. 6, which shows a block diagram of a programmable processing system 600 suitable for implementing or performing implementations of the invention. The system 600 includes a processor 604, a memory 602, typically random access memory (RAM), a program memory 613 (for example, a writable read-only memory (ROM) such as a flash ROM), a telephony communication port 606 for voice based communication, a network communication port 608 for data communication, a secondary storage 610 with secondary storage controller, a display device 615 with display controller, and input/output (I/O) ports 612 also with I/O controller operatively coupled together over a bus 614. The system 600 can be preprogrammed, in ROM, for example, or it can be programmed (and reprogrammed) by loading a program from another source (for example, from a floppy disk, a CD-ROM, or another mobile device or computer).

Memory 602 includes a number of software components designed in accordance with the present invention. These components include a voice application, a voice dialog server, a voice XML adapter, a voice XML browser, a text-to-speech synthesis component 625, an automatic speech recognition component 624 and an operating system 626 that manages resources for one or more of the previously described components. These components are designed to interact and work with one or components illustrated and described above with respect to FIG. 1. Alternate implementations of the present invention further include interactive voice clients 134, interactive voice response (IVR) 134, ASP/ISP 122 related components, voice portals 124 components and voice gateways 126 components in memory 602 (not pictured) and/or in secondary storage 610 (not pictured).

Secondary storage 610 is suitable for storing executable computer programs, including programs embodying the present invention, and data including an application repository 630 local storage area or removable storage for storing DML scripts and code based applications.

Display device 615 includes a display controller suitable for importing, exporting and processing video and image data and presenting such information for viewing on display device 615 or other display devices on other systems. This display device 615 can be large for desktop/office use or smaller for portable use with a portable computer or mobile voice-enabled communication device.

Input/output (I/O) ports 612 are coupled to system 600 through bus 614. Input/output ports 612 facilitate the receipt and transmission of data (e.g., text, images, videos, and animations) in analog or digital form over communication links such as a serial link, local area network, wireless link, and parallel link.

Also input/output (I/O) ports 612 facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 600.

While specific embodiments have been described herein for purposes of illustration, various modifications may be made without departing from the spirit and scope of the invention. For example, a backend system having a calendar system can provide recent calendaring appointments and search the data field entries from the calendar to assist in improving voice recognition. Voice recognition processing compares the voice requests with calendar entries, appointments and other data field entries using the extra-grammatical information in a calendar to further constrain a recognition grammar or process. For example, voice recognition processing may use the most recent 6 months of calendar entries to create grammars, process voice requests or otherwise constrain the voice recognition process. In addition, location-based information can also be used as additional extra-grammatical information to further constrain and improve voice recognition. For example, a user's current or recent geographical location can be used to assist in voice recognition for the particular user. The user's current or recent geographic positions can be used to constrain and narrow the possible results from a voice recognition. Other extra-grammatical information includes using statistical information of a user or a group of users when using certain applications. This statistical information or application usage can help improve voice recognition made by either the user or group or users. For example, these patterns can include frequently made database queries, website searches or other information patterns. Backend systems dealing with status, privileges, clearance and security profiles on a user may also provide extra-grammatical information to further improve voice recognition. For example, these extra-grammatical constraints would constrain the voice recognition process to consider the security profile and clearance associated with one or more users. Project milestones and workflow processes found in project management can also be used for improving voice recognition. If voice recognition uses extra-grammatical constrains from project management, the voice recognition system will be constrained by limitations in a projection management system to further improve the voice recognition accuracy and efficiency. An additional constraint useful in voice recognition could also include available resources provided in project management. For example, a voice request made for a resource can be compared against resources in-use, available, under repair and entered in a project management system to improve voice recognition processing. Accordingly, the invention is not limited to the above-described implementations, but instead is defined by the appended claims in light of their full scope of equivalents.

What is claimed is:

1. A method for accessing data from entries in a database fields of a backend system, comprising:

providing an unstructured grammar generated, at least in part, from the entries in the database fields of the backend system, the unstructured grammar including permutations of data in the various entries in those database fields;

updating the unstructured grammar as the database of the backend system is modified;

receiving a set of variables from a voice recognizer processing a voice request for information in the backend system;

processing an integration method using the set of variables returned from the recognizer and the unstructured grammar generated from entries in the database fields of a backend system;

requesting backend data from the backend system using the integration method and the set of variables as applied to the unstructured grammar; and receiving backend data from the backend system responsive to the integration method used to request the backend data.

2. The method of claim 1 further comprising, ranking the received data using extra-grammatical information to increase the probability that the backend data provided is responsive to the voice request.

3. The method of claim 2 wherein the extra-grammatical information includes calendar information to increase the probability that the backend data provided is responsive to the voice request.

4. The method of claim 2 wherein the extra-grammatical information includes location-based information to increase the probability that the backend data provided is responsive to the voice request.

5. The method of claim 2 wherein the extra-grammatical information includes statistical information on a user or group of users to increase the probability that the backend data provided is responsive to the voice request.

6. The method of claim 2 wherein the extra-grammatical information includes security and authorization information associated with a user to increase the probability that the backend data provided is responsive to the voice request.

7. The method of claim 2 wherein the extra-grammatical information used to rank the data from the backend system includes a set of user preferences.

8. The method of claim 2 wherein the extra-grammatical information used to rank the data from the backend system includes historical voice request information by a user.

9. The method of claim 2 wherein the extra-grammatical information used to rank the data from the backend system includes historical categorical information requested by a user.

10. The method of claim 2 wherein the extra-grammatical information used to rank the data from the backend system includes a list of entities having previous relationships with the user.

11. The method of claim 1 further comprising, processing a state model to assist in processing the integration method corresponding to the voice request for data from the backend system.

12. The method of claim 11 wherein the state model further describes the manner of presenting data from the backend system.

13. The method of claim 1 wherein the integration method is compatible with a database query language used to access data in a database.

14. The method of claim 1 wherein the unstructured grammar corresponds to a permutation of entries in one or more fields in a database associated with a backend system.

15. The method of claim 14 wherein the entries in one or more fields in the database further include additional identifiers that correspond and reference one or more entries in the database.

16. The method of claim 15 wherein the additional identifiers are selected from a set of identifier types including abbreviations, alternate abbreviations, synonyms, homonyms, misspellings, slang, vernacular and other identifiers associated with each of the one or more entries in one or more fields in the database.

17. The method of claim 1, wherein providing includes generating the unstructured grammar wherein generating comprises:
    combining data entries from data fields in the database of the backend system; and
    generating permutations of the data entries to increase the overall size of the grammar and probability of identifying matches against the grammar from the voice requests.

18. The method of claim 17, further comprising prioritizing the permutations of the data entries according to information in the database, wherein the permutations of the data entries are prioritized according to extra-grammatical information related to the voice request.

19. The method of claim 17, further comprising prioritizing the permutations of the data entries according to information in the database, wherein the permutations of the data entries are prioritized according to extra-grammatical information related to a user.

20. The method of claim 17, further comprising prioritizing the permutations of the data entries according to information in the database, wherein the permutations of the data entries are prioritized according to extra-grammatical information describing historical patterns of accessing data entries in the database.

21. The method of claim 17 wherein the database is associated with a backend system used to manage enterprise information.

22. The method of claim 17 wherein the data entries used to create the unstructured grammar are selected from a subset of data fields in the database associated with extra-grammatical information.

* * * * *